United States Patent
Kim

(10) Patent No.: US 9,231,922 B2
(45) Date of Patent: Jan. 5, 2016

(54) CLOUD STORAGE SYSTEM, DATA ENCRYPTION PROCESSING DEVICE AND DATA ENCRYPTION METHOD IN CLOUD STORAGE SYSTEM

(71) Applicant: SK Telecom Co., Ltd., Seoul (KR)

(72) Inventor: Seung Min Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 208 days.

(21) Appl. No.: 14/020,366

(22) Filed: Sep. 6, 2013

(65) Prior Publication Data

US 2014/0173272 A1   Jun. 19, 2014

Related U.S. Application Data

(63) Continuation of application No. PCT/KR2012/000258, filed on Jan. 11, 2012.

(30) Foreign Application Priority Data

Mar. 9, 2011   (KR) .................. 10-2011-0020924

(51) Int. Cl.
| | |
|---|---|
| G06F 21/00 | (2013.01) |
| H04L 29/06 | (2006.01) |
| H04L 9/28 | (2006.01) |
| G06F 21/60 | (2013.01) |
| G06F 21/62 | (2013.01) |

(52) U.S. Cl.
CPC ............ *H04L 63/0428* (2013.01); *G06F 21/60* (2013.01); *G06F 21/6218* (2013.01); *H04L 9/28* (2013.01)

(58) Field of Classification Search
CPC ......... G06F 21/60; G06F 21/602; H04L 9/28; H04L 8/088
See application file for complete search history.

(56) References Cited

U.S. PATENT DOCUMENTS

| | | | |
|---|---|---|---|
| 2006/0188097 A1 | 8/2006 | Taniguchi et al. | |
| 2007/0101143 A1 | 5/2007 | Iwata et al. | |
| 2007/0177766 A1 | 8/2007 | Kasahara et al. | |
| 2012/0042162 A1* | 2/2012 | Anglin et al. ................ | 713/165 |

FOREIGN PATENT DOCUMENTS

| | | |
|---|---|---|
| CN | 101246529 A | 8/2008 |
| JP | H0764892 B2 | 6/1986 |

(Continued)

OTHER PUBLICATIONS

Chinese Office Action mailed May 28, 2015 for corresponding Chinese Application No. 201280012057.2.

*Primary Examiner* — Edward Zee
(74) *Attorney, Agent, or Firm* — Hauptman Ham, LLP

(57) ABSTRACT

A cloud storage system includes a plurality of cloud storage modules for storing and managing data and a data encryption processing device. The data encryption processing device includes a priority manager for managing priorities on encrypting data of a plurality of cloud storage modules by using information on whether encryption processing for each of the plurality of the cloud storage modules is supported; and an encryption requester for selecting at least one cloud storage module on the basis of the priorities managed by the priority manager when receiving request of a data encryption, and performing, by the selected at least one cloud storage module, encryption after delivering the data to the selected cloud storage module.

16 Claims, 2 Drawing Sheets

(56) References Cited

FOREIGN PATENT DOCUMENTS

| JP | 07064892 A | 3/1995 |
|---|---|---|
| JP | 2006236049 | 9/2006 |
| JP | 2007052542 A | 3/2007 |
| JP | 2007-206942 | 8/2007 |
| KR | 1020030043447 | 6/2003 |

* cited by examiner

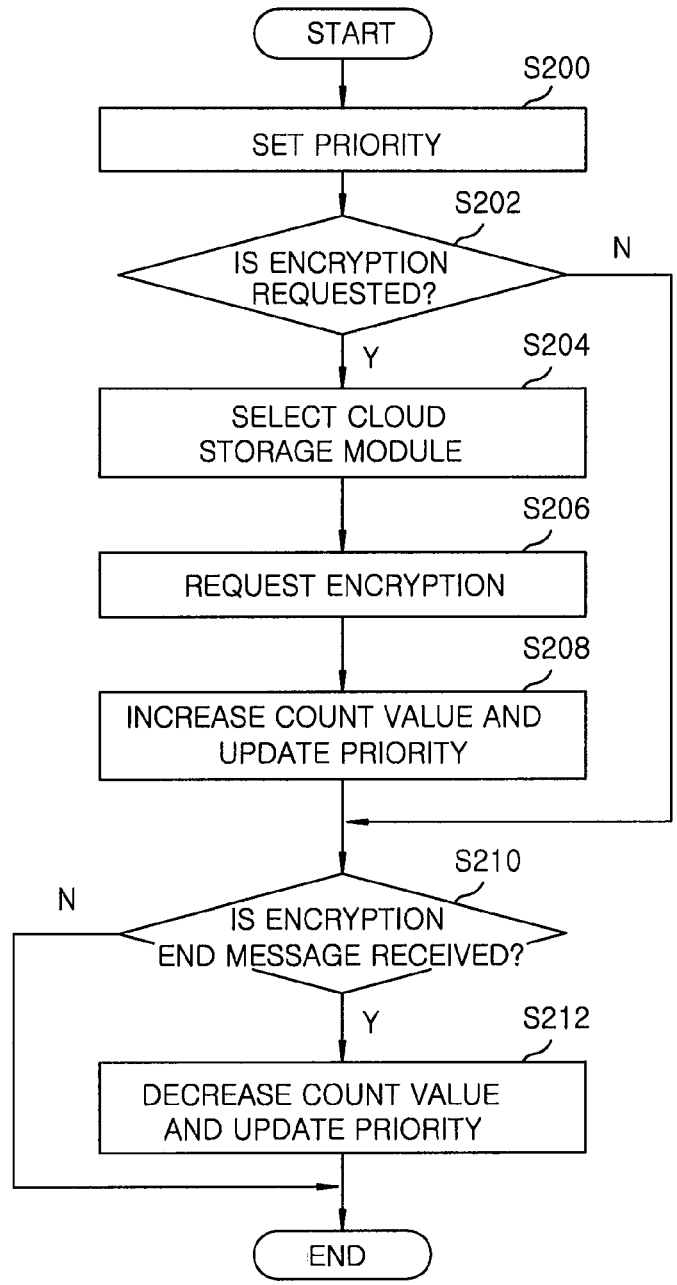

CLOUD STORAGE SYSTEM, DATA ENCRYPTION PROCESSING DEVICE AND DATA ENCRYPTION METHOD IN CLOUD STORAGE SYSTEM

CROSS REFERENCE TO RELATED APPLICATION

This application is a continuation of International Application No. PCT/KR2012/000258, filed Jan. 11, 2012, which claims the priority to and benefit of Korean Patent Application No. 10-2011-0020924, filed on Mar. 9, 2011 in Korea. The disclosures of the above-listed applications are hereby incorporated by reference herein in their entirety.

TECHNICAL FIELD

The present disclosure relates to a cloud storage system, a device and method for performing a data encryption processing in the cloud storage system.

BACKGROUND ART

The statements in this section merely provide background information related to the present disclosure and may not constitute prior art. Generally, in order to use an information technology (IT) environment, a function is implemented by integrating elements such as a server, a storage, software, a solution, a line, etc., and solutions, such as a website, mail ERP, CRM, etc., are developed. The inventor(s) has experienced that in such development, the introduction of software and the integration and customizing of systems are needed, and thus, it is required to study separate technology. The inventor(s) has noted that cloud computing technology has been recently developed in which an IT environment is constructed to enable the use of a service even without professionalism of separated technology and is usable.

Such cloud computing can be largely categorized into three fields: namely, (i) Software as a Service (SaaS) that provides a software application service as a service; (ii) Platform as a Service (PaaS) that provides a standardized platform as a service; and (iii) Infrastructure as a Service (IaaS) that provides an infrastructure, such as a storage, a network, etc., as a service.

A cloud storage system, one of the cloud computing technology, virtually makes different users' data appear to be stored in separate spaces, but actually stores the data in the same storage space physically.

The cloud storage system does not encrypt and store data itself when storing the data but encrypts and stores the data in transmitting the data.

On the other hand, the inventor(s) has noted that a function of encrypting and storing a document is necessarily needed for storing a document (for example, documents of companies) requiring security in a cloud storage.

However, the inventor(s) has experienced that the cloud storage system that provides a storage service for large-scale data causes overhead of calculation necessary for encrypting and decrypting data when desiring to directly support an encryption function, and thus, the use of many resources is needed.

SUMMARY

In accordance with some embodiments of the present disclosure, a data encryption processing device comprises a priority manager and an encryption requester. The priority manager is configured to manage a priority to encrypt data of each of a plurality of cloud storage modules based on information regarding whether to support encryption processing to said each of the plurality of the cloud storage modules; and an encryption requester configured to select at least one cloud storage module among the plurality of the cloud storage modules based on the priorities managed by the priority manager, and transfer data to the selected at least one cloud storage module to request the selected at least one cloud storage module to perform encryption of the data, in response to a data encryption request.

In accordance with some embodiments of the present disclosure, a data encryption processing device is configured to set a priority to encrypt data of each of a plurality of cloud storage modules to store the priority in a memory, based on information regarding whether to support encryption processing to each of the plurality of the cloud storage modules; select at least one cloud storage module based on the priority stored in the memory, when requesting encryption of the data; and transmit the data to the selected at least one cloud storage module to request the selected at least one cloud storage module to perform encryption of the data.

In accordance with some embodiments of the present disclosure, a cloud storage system for data encryption processing comprises a data encryption processing device; and a plurality of cloud storage modules. The plurality of cloud storage modules is configured to store and manage data and connected with the data encryption processing device over a communication network, wherein each of the plurality of cloud storage modules includes a cloud storage and a controller. The cloud storage configured to store the encrypted data and resource information. And the controller configured to control the cloud storage, provide the resource information to the data encryption processing device, encrypt data when receiving a request for data encryption from the data encryption processing device, store the encrypted data in the cloud storage, and decrypt the encrypted data stored in the cloud storage and supply the decrypted data to at least one different cloud storage module among the plurality of the cloud storage modules when receiving a request for the decrypted data from the data encryption processing device.

BRIEF DESCRIPTION OF THE DRAWINGS

FIG. 2 is a flowchart of a method of encrypting data in the cloud storage system in accordance with at least one embodiment of the present disclosure.

DETAILED DESCRIPTION

Figure 1:
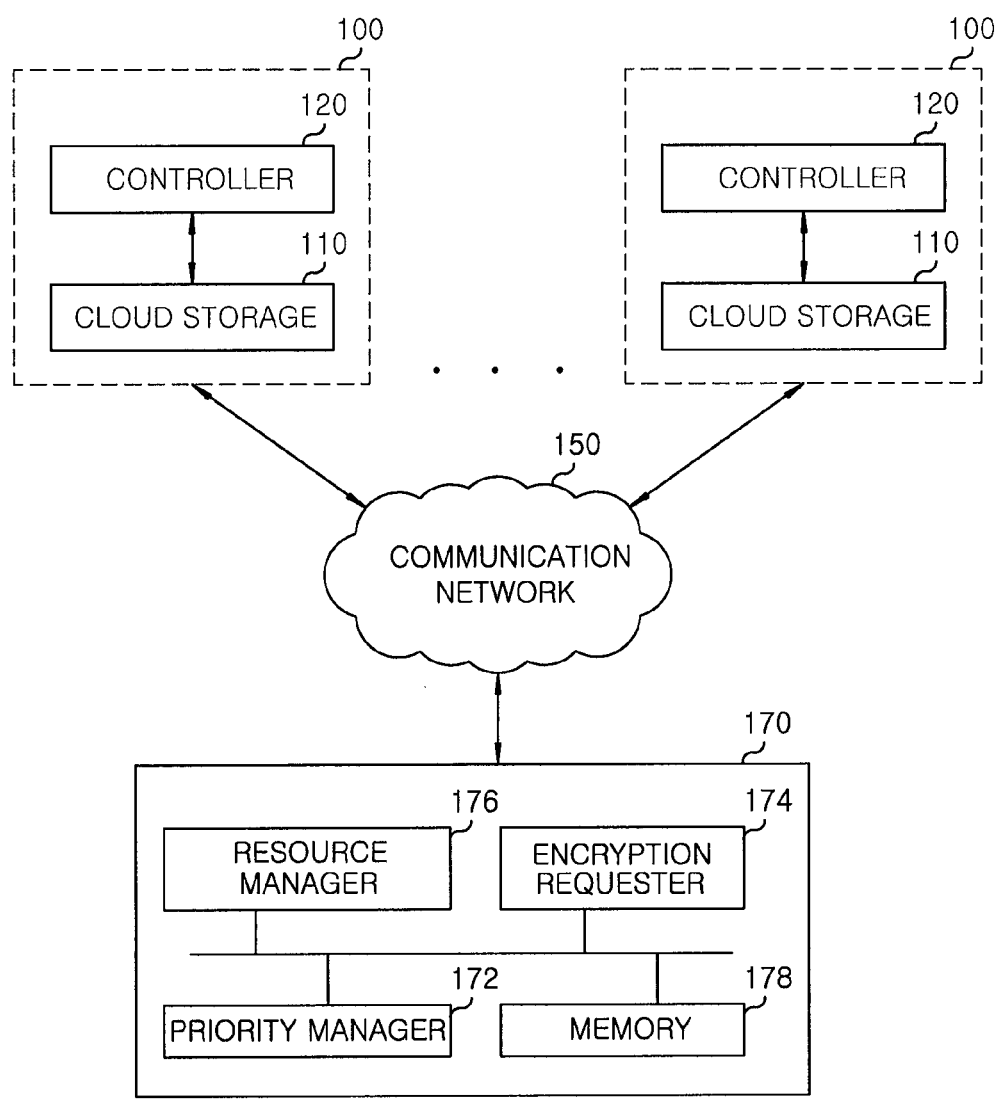
FIG. 1 is a block diagram of a cloud storage system in accordance with at least one embodiment of the present disclosure.

FIG. 1 is a block diagram of a cloud storage system in accordance with at least one embodiment of the present disclosure. The cloud storage system includes a plurality of cloud storage modules 100, and a data encryption processing device 170 that are connected to the plurality of cloud storage modules 100 over a communication network 150.

Each of the cloud storage modules 100 includes a cloud storage 110 (for example, a hard disc, a memory, or the like) that provides a storage service for large-scale data to a company or an individual, and a controller 120 that is implemented as a central processing unit (CPU) for controlling the cloud storage 110. The cloud storage module 100 encrypts data according to a data encryption request from the data encryption processing device 170, and stores the encrypted data in the cloud storage 110. Each of the cloud storage modules 100 includes a communication interface (not show) also can communicate to each other and the data encryption processing device 170 over communication network 150 including, but not limited to, cellular, Wi-Fi, LAN, WAN, CDMA, WCDMA, GSM, LTE and EPC networks, and cloud computing networks. Alternatively, the communication interface can be installed as a communication module in a part of, or independently from, the controller 120.

According to at least one embodiment of the present disclosure, the plurality of cloud storage modules 100 are largely categorized into two types, namely, a type of cloud storage module in which the controller 120 supports (or performs) processing of data encryption, and a type of cloud storage module in which the controller 120 cannot support processing of data encryption. Here, as an example of the controller 120 that supports processing of data encryption, there may be a CPU having an advanced encryption standard new instruction (AES-NI) function.

Each cloud storage module 100 provides its own resource information to the data encryption processing device 170. Here, the resource information may include resource information regarding the controller 120 and cloud storage 110. Also, the controller 120 of each cloud storage module 100 may encrypt data, when encryption of the data is requested from the data encryption processing device 170, store the encrypted data in the cloud storage 110. When receiving request of supplying a decrypted data from the data encryption processing device 170, the controller 120 of each cloud storage module 100 decrypts the encrypted data stored in the cloud storage 110, and supply the decrypted data to at least one different cloud storage module among the plurality of cloud storage modules 100.

The data encryption processing device 170 requests data encryption from at least one cloud storage module selected among the plurality of cloud storage modules 100, and allows the selected cloud storage module 100 to store encrypted data or to supply encrypted data stored in the selected cloud storage module 100 to the at least one different cloud storage module according to a request of the at least one different cloud storage module among the plurality of cloud storage modules 100.

In at least one embodiment of the present disclosure, although the data encryption processing device 170 is connected to the plurality of cloud storage modules 100 over the communication network 150, the above-described function of the data encryption processing device 170 may be embodied in, for example, a computer program or hardware module where the program is installed, and be implemented in each cloud storage module 100.

As illustrated in FIG. 1, the data encryption processing device 170 includes a priority manager 172, an encryption requester 174, a resource manager 176, and a memory 178.

The priority manager 172 separately manages at least one of the plurality of cloud storage modules 100 in such a manner of checking (or identifying or distinguishing) which could storage module(s) is enabling the support of encryption processing or disenabling the support of encryption processing, according to resource information regarding each of the plurality of cloud storage modules 100 connected thereto over the communication network 150. Also, as described later, the priority manager 172 grades an encryption priority of each cloud storage module 100 enabling the support of encryption processing, based on a count value of the number of encryption requests for and resource information regarding each of the plurality of cloud storage modules 100. The graded priority is stored in the memory 178. In the priority manager 172, a cloud storage module enabling the support of encryption processing is higher in grading an encryption priority than a cloud storage module disenabling the support of encryption processing.

When a company or an individual requests encryption of certain data, in response to the encryption request, the encryption requester 174 transmits the requested certain data to a certain cloud storage module 100 selected according to priorities of each of the cloud storage modules 100, and then requests the selected certain cloud storage module 100 to perform encryption for the transmitted certain data. When requesting the selected certain cloud storage module 100 to perform the encryption for the transmitted certain data, the encryption requester 174 counts up the number of requests for encryption that is being currently performed in the certain cloud storage module 100 selected for encrypting the certain data. Further, when the selected cloud storage module ends performing encryption for the certain data, the encryption requester 174 counts down the number of encryption requests. In other words, the encryption requester 174 selects a cloud storage module to perform data encryption among the plurality of graded cloud storage modules 100, based on a count value of the number of encryption requests and whether to support encryption processing to each of the cloud storage modules 100. In more detail, the encryption requester 174 selects at least one cloud storage module among the plurality of the cloud storage modules 100, which can be enabling the support of encryption processing, according to priorities graded in descending order or ascending order of count value of the number of encryption requests, and requests data encryption from the selected at least one cloud storage module.

The priority manager 172 changes (or updates) a priority of each of cloud storage modules 100 according to a count value of the number of encryption requests being changed. Specifically, when requesting data encryption and when ending the data encryption, the priority manager 172 recognizes the change of the count value of the number of encryption requests to change the priority of each of the cloud storage modules 100.

For example, a certain cloud storage module selected by the encryption requester 174 may complete data encryption, and then, the certain cloud storage module may store the encrypted data. Alternatively a different cloud storage module of the plurality of the cloud storage modules 100 may store the encrypted data in its own cloud storage.

The resource manager 176 manages available resource information, supplied from each of the cloud storage modules 100, regarding each of the cloud storage modules 100. Here, the resource information includes a size of encrypted data of each cloud storage module 100, and specifications of a controller 120 and a cloud storage 110 of each cloud storage module 100.

As described above, unlike a cloud storage module to perform encryption being selected according to whether to support encryption processing and a count value of the number of encryption requests, as an alternative scheme, the priority manager 172 may change the priorities of the plurality of the cloud storage modules 100 based on a changed (or updated) count value of the number of encryption requests and resource information supplied from the resource manager 176. Meanwhile, the data encryption processing device 170 includes a communication interface (not show) which can communicate to at least one of the plurality of the cloud storage modules 100 over communication network 150 including, but not limited to, cellular, Wi-Fi, LAN, WAN, CDMA, WCDMA, GSM, LTE and EPC networks, and cloud computing networks. Alternatively, the communication interface can be installed as a communication module in a part of, or independently from, one component of the data encryption processing device 170. Other components of the data encryption processing device 170, such as the priority manager 172, the encryption requester 174 and the resource manager 176 are implemented by one or more processors and/or application-specific integrated circuits (ASICs).

FIG. 2 is a flowchart of a method of encrypting data in the cloud storage system in accordance with at least one embodiment of the present disclosure.

First, as illustrated in FIG. 2, the priority manager 172 receives information regarding whether to support encryption processing from each of the plurality of the cloud storage modules 100 connected thereto over the communication network 150, and grades a priority of each of the plurality of the cloud storage modules 100, based on the information regarding whether to support encryption processing and a count value of the number of encryption requests for each of the plurality of the cloud storage modules 100. The graded priorities are stored in the memory 178 in operation S200.

Subsequently, when an arbitrary company or a user requests encryption of data at a time when the data is stored in operation S202, the encryption requester 174 selects at least one cloud storage module among the plurality of the cloud storage modules 100 to perform data encryption according to the priorities of the respective cloud storage modules 100 stored in the memory 178 in operation S204.

Then, in operation S206, the encryption requester 174 transmits data to the selected at least one cloud storage module to perform, by the selected at least one cloud storage module, encryption of the data. Therefore, the selected at least one cloud storage module encrypts the data using its own resource information, and stores the encrypted data in a cloud storage of the selected at least one cloud storage module.

After the encryption request, in operation S208, the encryption requester 174 increases a count value of the number of encryption requests for the selected at least one cloud storage module 100, and supplies (or transmits) the increased count value to the priority manager 172. Thus, the priority manager 172 updates a priority of each cloud storage module 100 having a priority right to encrypt in real time, based on the increased count value.

Subsequently, in operation S210, the encryption requester 174 determines whether encryption is ended in the selected at least one cloud storage module. When a message indicating "end of encryption" is received from the selected at least one cloud storage module, the encryption requester 174 proceeds to operation S212. In operation S212, the encryption requester 174 decreases a count value of the number of encryption requests for the selected at least one cloud storage module, and supplies (or transmits) the decreased count value to the priority manager 172. Thus, the priority manager 172 updates a priority of each cloud storage module 100 having a priority right to encrypt according to the decreased count value.

According to the above-described embodiments of the present disclosure, a cloud storage module connected to the data encryption processing device over the communication network directly performs an encryption processing operation that affects calculation overhead, and thus can reduce the overall calculation overhead of the cloud storage system and moreover quickly process calculation of data encryption.

Moreover, in at least one embodiment of the present disclosure, it has been described above as an example that a cloud storage module 100 is selected based on whether to support encryption processing and a count value of the number of encryption requests, and the selected cloud storage module 100 encrypts data. However, as another example, a cloud storage module 100 to encrypt data may be selected based on resource information, whether to support encryption processing, and a count value. For example, the priority manager 172 may set a priority of each cloud storage module 100 based on resource information regarding the controller and the memory, information regarding whether to support encryption processing, and a count value of the number of encryption requests, which are supplied from the plurality of cloud storage modules 100.

The above-described encryption processing device 170 according to the at least one embodiment of the present disclosure may be implemented in the cloud storage module 100. Also, both or either of the encryption processing device 170 and each of the plurality of cloud storage modules 100 has been described above, for example, as an independent device including a processor that autonomously processes information and a memory, which is merely exemplified for a description on the embodiments of the present disclosure. The present disclosure is not limited thereto. For example, the present disclosure may include a cloud computing environment in which the above-described information is permanently stored in a virtualization device (or server) on a network, and temporarily stored in the encryption processing device 170 and the plurality of cloud storage modules 100. That is, it should be noted that the above-described information is stored in the virtualization device on the network, and a user equipment including various multimedia functions may use the above-described information anywhere at any time.

The present disclosure may be used as technology that encrypts data and stores the encrypted data in a storage in a cloud computing environment. Moreover, the present disclosure may be used as technology that can enhance processing performance in encrypting data in a cloud environment, and moreover efficiently manage resources in the cloud environment. The some embodiments of the present disclosure directly encrypts and stores data using resources of a plurality of cloud storage modules, and can thereby reduce calculation overhead caused by data encryption, thus enhancing security of data such as a secret document. Moreover, the present disclosure grades priorities of the respective cloud storage modules based on whether to support encryption processing by a central processing units of each of the cloud storage modules, and selects a specific cloud storage module based on the graded priorities to allow the selected cloud storage module to encrypt data, thus enhancing a processing speed of data encryption.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although the various embodiments of the present disclosure have been described, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure.

The invention claimed is:

1. A data encryption processing device of a cloud storage system, comprising:
   a priority manager configured to
      manage a priority to encrypt data of each of a plurality of cloud storage modules based on information regarding whether the plurality of the cloud storage modules is subject to encryption processing, and
      update the priority of said each of the plurality of the cloud storage modules, based on
         a counter value for encryption requests for said each of the plurality of the cloud storage modules, and
         the information regarding whether said each of the plurality of the cloud storage modules is subject to the encryption processing; and
   an encryption requester configured to
      select at least one cloud storage module among the plurality of the cloud storage modules based on the priority to encrypt data of the plurality of cloud storage modules managed by the priority manager, and
      transfer data to the selected at least one cloud storage module to request the selected at least one cloud storage module to perform encryption of the transferred data, in response to a data encryption request.

2. The data encryption processing device of claim 1, wherein the encryption requester is configured to count the counter value for encryption requests for said each of the plurality of the cloud storage modules.

3. The data encryption processing device of claim 2, wherein when requesting the selected at least one cloud storage module to perform encryption of the transferred data, the encryption requester increases a counter value for encryption requests for the selected at least one cloud storage module, and
   when encryption of the transferred data is ended in the selected at least one cloud storage module, the encryption requester decreases the counter value for encryption requests for the selected at least one cloud storage module.

4. The data encryption processing device of claim 3, wherein when requesting the selected at least one cloud storage module to perform encryption of the transferred data and when encryption of the transferred data is ended in the selected at least one cloud storage module, the priority manager updates the priority of each of the plurality of the cloud storage modules based on the counter value for encryption requests for said each of the plurality of the cloud storage modules.

5. The data encryption processing device of claim 1, further comprising:
   a resource manager configured to manage resource information regarding each of the plurality of the cloud storage modules.

6. The data encryption processing device of claim 5, wherein the priority manager is configured to manage the priority of each of the plurality of the cloud storage modules based on the resource information and the information regarding whether said each of the plurality of the cloud storage modules are subject to the encryption processing.

7. The data encryption processing device of claim 5, wherein the resource manager is configured to receive resource information from the selected at least one cloud storage module.

8. The data encryption processing device of claim 7, wherein based on the received resource information and a counted number of encryption requests from the encryption requester, the priority manager is configured to update the priority of said each of the plurality of the cloud storage module.

9. The data encryption processing device of claim 1, wherein the encryption requester is configured to request the selected at least one cloud storage module to store the encrypted data.

10. A data encryption method performed by a data encryption processing device in a cloud storage system, the data encryption method comprising:
   setting a priority to encrypt data of each of a plurality of cloud storage modules to store the priority in a memory, based on information regarding whether said each of the plurality of the cloud storage modules is subject to encryption processing;
   selecting at least one cloud storage module based on the priority stored in the memory; and
   transmitting data to the selected at least one cloud storage module to request the selected at least one cloud storage module to perform encryption of the transferred data,
   wherein
   the priority of said each of the plurality of the cloud storage modules is set further based on a counter value for encryption requests for said each of the plurality of the cloud storage modules and the information regarding whether said each of the plurality of the cloud storage modules is subject to the encryption processing.

11. The data encryption method of claim 10, further comprising:
   increasing, when requesting encryption of the transferred data to the selected at least one cloud storage module, a counter value for encryption requests for the selected cloud storage module;
   updating the priority of said each of the plurality of the cloud storage modules according to the counter value for encryption requests for said each of the plurality of the cloud storage modules.

12. The data encryption method of claim 10, further comprising:
   decreasing, when encryption of the transferred data is ended in the selected at least one cloud storage module, a counter value for encryption requests for said each of the plurality of the cloud storage modules; and updating the priority of each of the plurality of the cloud storage modules according to the counter value for encryption requests for said each of the plurality of the cloud storage modules.

13. The data encryption method of claim 10, further comprising:
receiving resource information from said each of the plurality of cloud storage modules,
wherein the priority of said each of the plurality of the cloud storage modules is set further based on the received resource information and the information regarding whether said each of the plurality of the cloud storage modules is subject to the encryption processing.

14. The data encryption method of claim 10, further comprising:
increasing, when requesting encryption of the transferred data from the selected at least one cloud storage module, a counter value for encryption requests for the selected at least one cloud storage module, and receiving resource information from the selected at least one cloud storage module;
updating the priority of said each of the plurality of the cloud storage modules according to the increased counter value for encryption requests and the received resource information;
decreasing, when encryption of the data is ended in the selected at least one cloud storage module, the counter value for encryption requests for the selected at least one cloud storage module, and receiving the resource information from the selected cloud storage module; and
updating the priority of said each of the plurality of the cloud storage modules according to the decreased counter value for encryption requests and the received resource information.

15. A cloud storage system for data encryption processing, comprising:
a data encryption processing device; and
a plurality of cloud storage modules configured to store and manage data and connected with the data encryption processing device over a communication network, wherein each of the plurality of cloud storage modules includes:
a cloud storage configured to store the encrypted data and resource information; and
a controller configured to
control the cloud storage,
provide the resource information to the data encryption processing device,
encrypt data when receiving a request for data encryption from the data encryption processing device,
store the encrypted data in the cloud storage, and
decrypt the encrypted data stored in the cloud storage and supply the decrypted data to at least one different cloud storage module among the plurality of the cloud storage modules when receiving a request for the decrypted data from the data encryption processing device,
wherein the data encryption processing device includes:
a priority manager configured to manage a priority to encrypt data of said each of the plurality of cloud storage modules based on information regarding whether said each of the plurality of cloud storage modules is subject to encryption processing; and
an encryption requester configured to
select at least one cloud storage module among the plurality of the cloud storage modules based on the priority to encrypt data of the plurality of cloud storage modules managed by the priority manager, and
transfer data to the selected at least one cloud storage module to request the selected at least one cloud storage module to perform encryption of the transferred data, in response to a data encryption request.

16. The cloud storage system of claim 15, wherein when requesting the selected at least one cloud storage module to perform encryption of the transferred data, the encryption requester increases a counter value for encryption requests for the selected at least one cloud storage module, and
when encryption of the transferred data is ended in the selected at least one cloud storage module, the encryption requester decreases the counter value for encryption requests for the selected at least one cloud storage module.

* * * * *